United States Patent [19]

Cloth

[11] Patent Number: 4,858,856
[45] Date of Patent: Aug. 22, 1989

[54] PRESSURE DEPENDENT RELEASE DEVICE FOR A PARACHUTE

[76] Inventor: Helmut Cloth, 4790 Paderborn, Riemekester 97a, Fed. Rep. of Germany

[21] Appl. No.: 164,152

[22] Filed: Mar. 4, 1988

[30] Foreign Application Priority Data

Mar. 6, 1987 [DE] Fed. Rep. of Germany ....... 3707294

[51] Int. Cl.$^4$ .............................................. B64D 17/56
[52] U.S. Cl. .................................. 244/149; 244/151 B
[58] Field of Search .................. 244/147, 149, 151 R, 244/151 A, 151 B

[56] References Cited

U.S. PATENT DOCUMENTS

| | | | |
|---|---|---|---|
| 2,497,772 | 2/1950 | Horning | 244/148 |
| 3,023,498 | 3/1962 | Temple et al. | 244/151 B |
| 3,142,958 | 8/1964 | Roberts et al. | 244/149 |
| 3,300,606 | 1/1967 | Starer et al. | 244/149 |
| 3,813,066 | 5/1974 | Raznov | 244/149 |
| 3,820,748 | 6/1974 | McDonald | 244/149 |
| 3,830,453 | 8/1974 | Cannarozzo | 244/148 |
| 3,992,999 | 11/1976 | Chevrier et al. | 244/149 |

*Primary Examiner*—Sherman D. Basinger
*Assistant Examiner*—Stephen P. Avila
*Attorney, Agent, or Firm*—Sprung Horn Kramer & Woods

[57] ABSTRACT

A releasing device for a parachute which is ready for use and folded and disposed in a receptacle and held together by securing string against the force of an unholding preloaded spring. The release device includes a breaking device for disconnecting the securing string and a control for actuating the breaking device at predetermined conditions. The control actuates the breaking device by an electric control signal derived after an initialization operation and depending on a barometric pressure which is present and further depending on the presence of a given pressure change rate. The breaking device comprises an energy storing device which is releasable by the electric control signal for disconnecting the securing string.

9 Claims, 4 Drawing Sheets 101 103 105 107 609

121 131 123 125 609

PRESSURE DEPENDENT RELEASE DEVICE FOR A PARACHUTE

The invention concerns a releasing device for a parachute which is in the state for use, folded and disposed in a receptacle and held together by a securing member against the force of an unholding preloaded spring, said releasing device having means for actuating said disconnecting means predetermined conditions.

STATE OF THE ART

The known apparatus for self-release, especially those for reserve canopies, consist of a mechanical barometric altimeter which operates a mechanical ripcord release depending on a predetermined altitude or pressure. They withdraw the parachute ripcord pins which are also connected to the ripcord handle for personel operation. In order to operate such a mechanism, a remarkable amount of mechanical stored energy is required. Consequently such apparatures are remarkably big and heavy. Therefore they are very little in use. Furthermore, since both the automatic ripcord release and the personal release handle are connected to the same ripcord pins, no further possibility for an external triggering is given. Beside this disadvantage, the mechanical barometric altimeters are very sensitive to mechanical shocks and they suffer from backlash which may lead to uncontrolled operations. This is especially dangerous in cases where several skydivers are near to each other either at the exit from a jump plane or during freefall since an unexpected release and opening of the parachute could cause danger to others. In sport-parachuting such an automatic release mechanism is only used to operate a reserve parachute. For safety reasons these automatic canopy release systems employ a sinking speed detector releasing it and opening it only if the main canopy is undeployed. However, also these speed detectors suffer from mechanical uncertainties leading to failure release conditions occasionaly. Therefore the use of this apparatus is often neglected.

With that given situation the purpose of the invention is to create an apparatus with higher reliability and smaller physical dimensions as well as lower weight.

The solution of the task is characterised in that said disconnecting means is a breaking device for said securing member and wherein said control means is composed of an electronic control means actuating said breaking device by an electronic control signal being deviced from the signal of an electronic pressure sensor which is continuously monitored and stored after an initialisation operation together with derived height and falling speed values.

GENERAL DESCRIPTION OF THE INVENTION

The following 6 important features of the invention are given:

First, the possible release depends on a varieaty of conditions that arise from presently measured data as well as those from the past which are used to build up a memory describing former changes in altitude versus time. This way accidental release operations on the basis of only present data are avoided.

Second, in cases where the memory does not clearly indicate a situation that should lead to release operation, this function is disabled to avoid dangerous accidental operations.

Third, due to its small outlines the complete apparatus can be stored within the parachute containment with possible remote control and display. Therefore the apparatus is protected against mechanical injuries and the complete system is designed to increase the acceptance by the users which is the only way to reduce the presently occurring deathly accidents happening when no automatic release mechanism is in use.

Fourth, the apparatus does not need to be initiated before and after each jump. It only needs to be initiated before the first use of a day and it is working continuously from there on.

Fifth, the apparatus contains self test features, indicating possible malfunction of the components. This way the user is informed about the proper operation in case and each time during initiating.

Sixth, the handling of the apparatus is reduced to operate only one push-button while the function is indicated on a monitor display. This leads to safe initiating operation.

SHORT DESCRIPTION OF THE DRAWING

The following figures outline the design of the invention. They show:

FIG. 1, parachuting rig with jump canopy and reserve canopy.

FIG. 2, the design of the electronic control unit.

FIG. 3, the design of a cutting system using explosive energy.

FIG. 4, the design of a cutting system using the mechanical energy of a spring.

FIG. 5, a blockdiagram of the control unit.

DETAILED DESCRIPTION OF THE DRAWINGS

Figure 1:
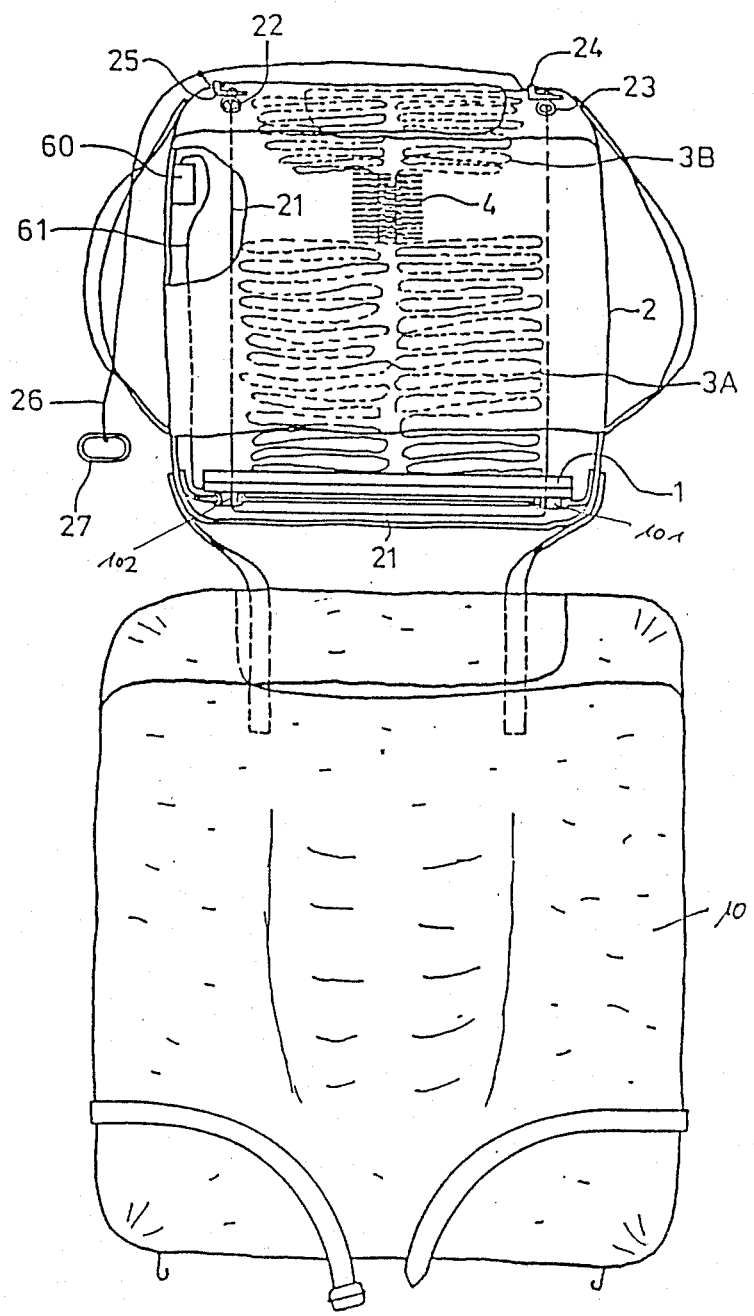

FIG. 1 shows a parachute rig with a partially opened reserve canopy container.

The upper container (2) contains the reserve canopy (3A) which is used in emergency situations. This reserve canopy (3A) is attached to a pilote chute (3B) while a spring (4) in the pilote chute (3B) serves for the deployment. Closing the system the flaps are compressed against the spring (4) and the equipment is held together when the pins (24, 25) stick through the loopends (22, 23) of the safety rope (21) pulled through the grommets. In case of emergency these pins (24, 25) can be removed by the skydiver pulling the handle (27), in case he is conscious. The new release device is located inside the reserve container (2) and it cuts the safety rope (21) underneath of the gromets. This creates an independent mechanism for the opening. A cable connected display and push-button control (60) unit can be located inside or outside the container (2). It may also be carried in front of the skydiver or be connected to his arm or wrist.

The cutting means (1) can be incorporated in a single housing with two openings (101, 102) through which the safety rope (21) penetrates. The cutting means (1) and the control unit (60) either is incorporated in a single housing or its opening unit is seperatly located connected by cables to the release control unit.

The lower container (10) contains the main canopy which is not affected by the invention as far as its automatic opening is not taken into account.

Figure 2:
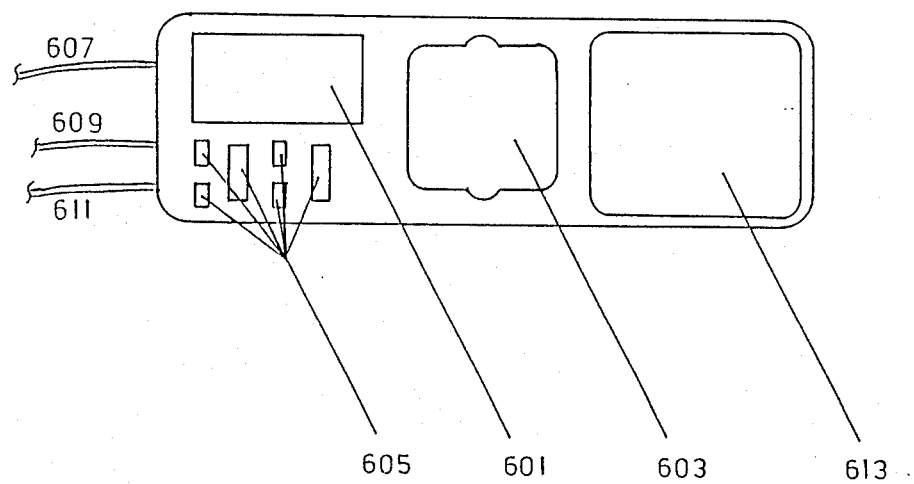

FIG. 2 shows a drawing of the control unit (60). It consists of a metal or plastic box containing a battery (603), a memory and computing unit (601), an amplifier and signal conditioning circuitry (605) as well as the pressure sensor (613). A cable (607) leads to a push button and display unit while the trigger cables (609, 611) lead to the cutting means. Preferably the entire control unit (60) is shielded against electromagnetic radiation by a mu-metal housing.

The battery preferably is of high capacity and low weight lithium-maganese type. The memory unit is equipped with an electrical erasable programable readonly memory storing calibration data and a watch dog procedure to control and restart the operation in case of accidental failures.

The amplifier and signal conditioning (605), with a selected pressure sensor and analog to digital converter delivering the measured data to the computing unit is designed to compensate for the temperature influences of various components.

In a simplified design, the memory and computing unit is an analog logarithmic pressure signal transducer accounting for the non linear relation between altitude and pressure. A differentiator detects the freefall speed and a preadjustible Schmitt-trigger detects the parachute opening height. The release trigger consists of a logic AND-gate to which the generated free fall speed and a given parachute opening height signal is fed.

Figure 3:
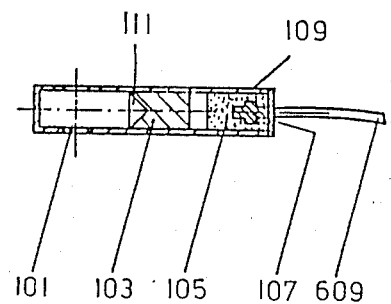
Figure 4:
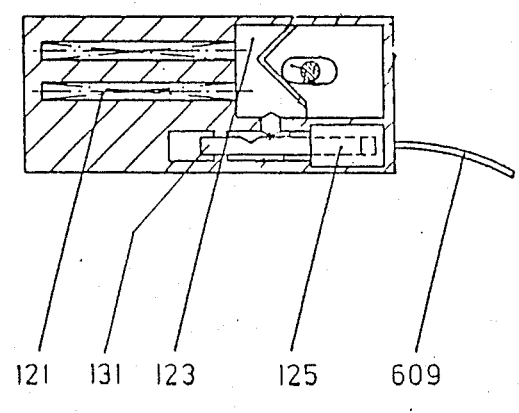

The parachute rig (2), shown in FIG. 1, contains two independent cutting means which are identical. Different examples for the construction of such cutting means are shown in FIG. 3 and FIG. 4 as cut off drawings.

What is claimed is:

1. A releasing device for a parachute which is in the state ready for use, folded and disposed in a receptacle and held together by securing string against the force of an unholding preloaded spring, said releasing device having means for disconnecting said securing string comprising a breaking device for said securing string and control means for actuating said disconnecting means at predetermined conditions, wherein said control means has means actuating said breaking device by an electric control signal being derived after an initialisation operation and depending on a barometric pressure present and further depending on the presence of a given pressure change rate, said breaking device comprises energy storing means which is releasable by said electric control signal for disconnecting said securing string, wherein said breaking device is disposed within a casing, said casing having passage holes for said securing string and which passage holes are closed by a cutting means after cutting the securing string when actuating by the release of the energy storing means.

2. A releasing device as claimed in claim 1, wherein said energy storing means and said cutting means comprise a preloaded spring carrying a cutting blade at one end which is releasably locked by an electromechanical actuator.

3. A releasing device as claimed in claim 1, wherein said energy storing means and said cutting means comprises explosive actuating means comprising a piston carrying a cutting blade and in which an explosive and an electric burnable detonator is positioned.

4. A releasing device as claimed in claim 1, wherein said control means is disposed inwardly of said receptacle.

5. A releasing device as claimed in claim 1, wherein said control means comprises at least one electronic pressure sensor which is positioned in or at said receptacle, data processing means which act cyclically on measured data of said pressure sensor to compensate for deviations of the measured data dependent from the actual position of the pressure sensor effected by movements of a skydiver carrying the releasing device, thus transforming the said measured data to real pressure values and real falling speed values at the actual measuring time, and from which real pressure values and falling speed values the release condition is derived.

6. A releasing device as claimed in claim 5, wherein said control means comprises digital electronic means including an analog to digital converter for converting the measured pressure data, a memory for storing the converted pressure data and data calculated therefrom including altitude, acceleration, velocity and time derived from a clock signal and from which stored data the release condition is derived by continuous monitoring procedures in a digital data processing unit.

7. A releasing device as claimed in claim 6, further comprising an operation panel, said operation panel being connected to an input of the processing unit which by a detection procedure accepts only such input data which are inputted in a predetermined time sequence.

8. A releasing device as claimed in claim 6, wherein said electronic means comprises compensating means for temperature depending deviations of said pressure measuring data.

9. A releasing device for a parachute which is in the state ready for use, folded and disposed in a receptacle and held together by securing string against the force of an unholding preloaded spring, said releasing device having means for disconnecting said securing string comprising a breaking device for said securing string and control means for actuating said disconnecting means at predetermined conditions, whereby said control means actuating said breaking device by an electric control signal being derived after an initialisation operation and depending on a barometric pressure present and further depending on the presence of a given a pressure change rate, said breaking device comprises energy storing means which is releasable by said electric control signal for disconnecting said securing string, wherein said control means comprises at least one electronic pressure sensor which is positioned in or at said receptacle, said control means are digital electronic means containing an analog to digital converter converting the measured pressure data of said pressure sensor, and said control means further comprises a memory for storing the converted pressure data and data calculated therefrom including altitude, acceleration, velocity and time derived from a clock signal and a monitoring procedure in a digital data processing unit of said digital electronic means is cyclically performed on said stored data to compensate for devications of the measured pressure data occurring dependent from the actual position of the pressure sensor effected by movements of a skydiver carrying the releasing device, thus transforming the measured data to real pressure values and real falling speed values at the actual measuring time, and from said real pressure values and falling speed values a release condition is derived.

* * * * *

UNITED STATES PATENT AND TRADEMARK OFFICE
CERTIFICATE OF CORRECTION

PATENT NO. : 4,858,856
DATED : August 22, 1989
INVENTOR(S) : Cloth

It is certified that error appears in the above-identified patent and that said Letters Patent is hereby corrected as shown below:

Column 3,
After line 28, insert the following:

--Figure 3 shows version 1 of a cutting means. It consists of a metallic cylindrical housing (109) with closed front ends. One end provides the hole (101) which is to be passed by the safety rope. On the other end the trigger cable (609) coming from the control unit to connect the control unit is connected to a ignition wire of a detonator (107). When the detonator (107) is ignited the explosive (105) explodes. This explosion is driving a piston (103) carrying a linear or ring blade (111) on its front side thereby moving towards the safety rope hole (101). First the blade (111) cuts the safety rope and then the piston (103) closes the hole by its body to prevent spreading smoke and heat into the surrounding.

The piston (103) is held in its initial position simply by friction.

Figure 4 shows an alternative version of the cutting means in which a tension loaded locked spring (121) carries a blade (123) at its front side. The spring release consists of an electric magnet (125), pulling the bolt (131) when the release signal is applied via the trigger cable (609).

Figure 5:
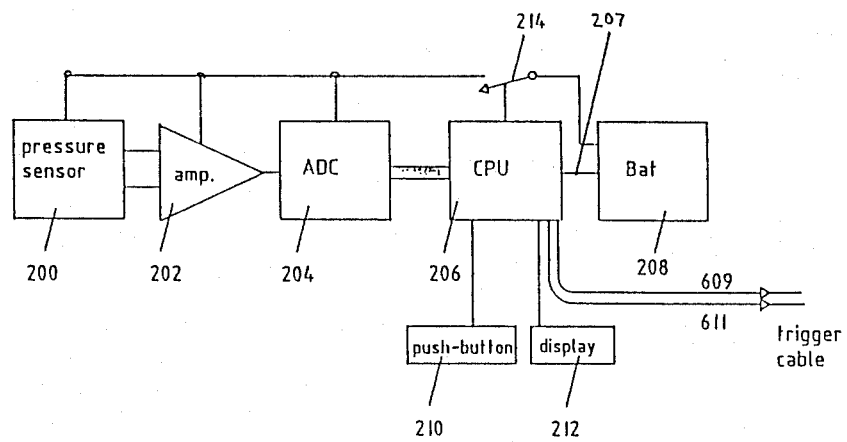

Figure 5 shows a block diagram of the control unit. The whole system is controlled by a micro processor (206) being powered by a battery (208). In the given example, the signal of a pressure sensor (200) is coupled to an amplifier (202) and then converted to digital data by an analog to digital converter (204). The data are processed in the processor (206). In case of a release, the trigger reaches the cutting system via the cables (609, 611).--

--As soon as the push-button is released, the system starts operating and up from then the displayed number indicates the relative landing altitude. The automatic release will always occur at 760 feet above the indicated number, if the mentioned other conditions will be fulfilled.

To save battery energy, the system shuts down after 14 hours of operation. During working time, the push-button is protected against accidental depressions.

If the push-button is depressed, according to a program feature the display starts blinking in a fixed cycle. In case the watching program of the push-button detects that the user follows such cycle time by depressions of the push-button several times, the program will reinitiate to enable the operator the selection of a different landing altitude.

A method for self calibration preferably is applied whereby the relation between the measured pressure and the relative altitude with respect the pressure at zero height is given by the barometric height function.

For practical use in digital computation this height function is approximated by linearised steps. Taking possible nonlinearities in the pressure measurement into account, the corresponding pressure-signal versus height data are rather derived by a self calibration procedure than from the barometric formula as a further improvement.

Each ready-build device individually will be calibrated when the pressure sensor signals are derived at predefined pressure-values and the value of the corresponding height is used as a reference for the stepwise linearised approximation function. This set of individual calibration data preferably is stored in an erasable electrical programmable read only memory of the control unit. They serve to the highest possible precision in altitude determination.

UNITED STATES PATENT AND TRADEMARK OFFICE
CERTIFICATE OF CORRECTION

PATENT NO.    : 4,858,856
DATED         : August 22, 1989
INVENTOR(S)   : Cloth

It is certified that error appears in the above-identified patent and that said Letters Patent is hereby corrected as shown below:

Column 3 (cont'd),

Pressure Dependent Release Device for a Parachute
  Automatic release device for parachutes where on the release a preloaded spring (4) catapults the pilot chute (3b) being embedded in a container (2) and kept closed by a safety rope (21).
  The release device consists of an electronic control unit (60) continuously measuring and processing the air pressure and further of a cutting means (1) of the safety rope (21) when triggered by the electronic control unit (60).
  The prefixed release altitude can be altered by the operator.
  Several combined processing procedures allow for the highest precision in altitude detection and of critical release conditions without any operations intervention. Restricting the release conditions thereby avoiding dangerous accidential release operations.--

Signed and Sealed this

Thirtieth Day of September, 2003

JAMES E. ROGAN
*Director of the United States Patent and Trademark Office*